US 6,529,584 B1

(12) United States Patent
Ravago et al.

(10) Patent No.: US 6,529,584 B1
(45) Date of Patent: Mar. 4, 2003

(54) AUDIO PROGRAM DELIVERY SYSTEM

(75) Inventors: Ben Ravago, Edison, NJ (US); Kenneth M. Engels, New York, NY (US); Shannon Stearman, New York, NY (US)

(73) Assignee: Rahsaan, Inc., New York, NY (US)

( * ) Notice: Subject to any disclaimer, the term of this patent is extended or adjusted under 35 U.S.C. 154(b) by 0 days.

(21) Appl. No.: 09/665,008

(22) Filed: Sep. 19, 2000

Related U.S. Application Data (60) Provisional application No. 60/159,199, filed on Oct. 13, 1999.

(51) Int. Cl.[7] ................................................ H04M 1/64
(52) U.S. Cl. ................................ 379/67.1; 379/101.01; 379/88.13
(58) Field of Search ......................... 379/101.01, 67.1, 379/68, 88.13, 88.16, 102.01, 102.02, 102.03, 374.01, 374.02; 705/26

(56) References Cited

U.S. PATENT DOCUMENTS

| | | | | |
|---|---|---|---|---|
| 5,661,787 A | * | 8/1997 | Pocock | 379/101.01 |
| 5,918,213 A | * | 6/1999 | Bernard | 705/26 |
| 6,014,427 A | * | 1/2000 | Hanson et al. | 379/67.1 |
| 6,192,340 B1 | * | 2/2001 | Abecassis | 704/270 |
| 6,218,958 B1 | * | 4/2001 | Eichstaedt et al. | 340/825.46 |

* cited by examiner

Primary Examiner—Fan Tsang
Assistant Examiner—Ovidio Escalante
(74) Attorney, Agent, or Firm—Skadden, Arps, Slate, Meagher & Flom LLP (57) ABSTRACT

A navigable audio delivery system includes an audio application and content. The application includes control data relating to the delivery of audio content to a user replay device. The delivery system facilitates the navigation between logical portions of the audio content by associating tag data with the audio content. The system also facilitates navigation between parallel portions of an audio program by including multiple layers of content in the audio program that is delivered to the user replay device.

5 Claims, 8 Drawing Sheets

AUDIO PROGRAM DELIVERY SYSTEM

PRIORITY CLAIM

This application claims priority to a Provisional Patent Application filed on Oct. 13, 1999, Ser. No. 60/159,199.

FIELD OF THE INVENTION

The present invention related to information delivery systems. Particularly, the invention relates to interactive audio delivery systems.

BACKGROUND

Consumers receive information by various media, including print, television, internet, and radio. The information provided to the consumer is generally pre-arranged and pre-selected, as is the case with radio, print, and television content.

The internet has facilitated services that deliver information with embedded hyperlinks, which allow a user to navigate to other information. Some internet based services allow a user to select categories for which content is provided on a personalized web page. However, the arrangement and production of the content remains pre-determined.

Certain users wish to control the selection and arrangement of content. In addition, certain users find that access to an internet browser is not always readily available. Thus, there is a need for a system and method that provide users with a more convenient and readily available information delivery and extraction mechanism.

SUMMARY

In accordance with the invention, there is provided a system for the delivery of navigable audio programs. The audio programs include audio content and corresponding control data. The system provides the audio content to the user in accordance with control data. The system allows users to control both the audio content selection and the control data employed to deliver the content. The user can navigate through the time progression of a program or between various layers of the program.

The present invention further includes a navigable audio replay system that includes an audio application database, the audio application database storing control data for controlling the replay of audio segments in an audio program. The system also includes an audio content database, which stores audio segments content. An application replay module extracts audio application data from the audio application database. The application replay module transmits control signals to an audio replay module. The control signals are generated in accordance with audio application data. The control signals facilitate the replaying of audio segments stored in the audio content database.

The system also includes an audio replay module. The audio replay module receives control signals from the application replay module and responds to control signals from the application replay module by facilitating the transmission of at least one audio segment to a user replay device. Finally the system includes a telephony interface, which facilitates the communication between the audio replay module and the user replay device. The telephony interface further facilitates the communication between the application replay module and the user replay module.

The present invention provides for logical navigation within audio content. The method for facilitating the logical navigation includes processing audio content to associate at least one navigation tag with the audio content, the navigation tag including data relating to a logical portion of the audio content. The method then facilitates the delivery of the audio content to a user replay device. A navigation command is received from the user replay device. The method finally modifies the replaying of the audio content in response to the navigation command received from the user replay device. The modifying includes facilitating the delivery of audio data associated with the navigation tag of the audio content.

The present invention provides an audio segment and at least one associated audio segment replayed in parallel with a portion of the first audio segment. The method includes retrieving an audio application, the audio application including data relating to audio segments associated with an audio program. The method then replays an audio program by facilitating the replay of a first audio segment to a user replay device, the first audio segment selected in accordance with the audio application data. The method finally makes available to the user replay device a second audio segment, the second audio segment selected in accordance with the audio application data. The second audio segment is delivered to the user replay device during the replay of the first audio segment in response to a user control signal.

DETAILED DESCRIPTION

The present invention will now be described with reference to an embodiment of a navigable audio program transmission system. The illustrated audio program transmission system is a telephony audio delivery system that delivers audio programs to users by a telephone interface. The structure of a network in accordance with the invention is first discussed with reference to illustrations of arrangements for audio program delivery. Next, the operation of an audio program delivery system is discussed with reference to flow diagrams. Finally, methods for delivering audio programing content to consumers, by employing the audio program delivery system, are discussed.

Figure 1:
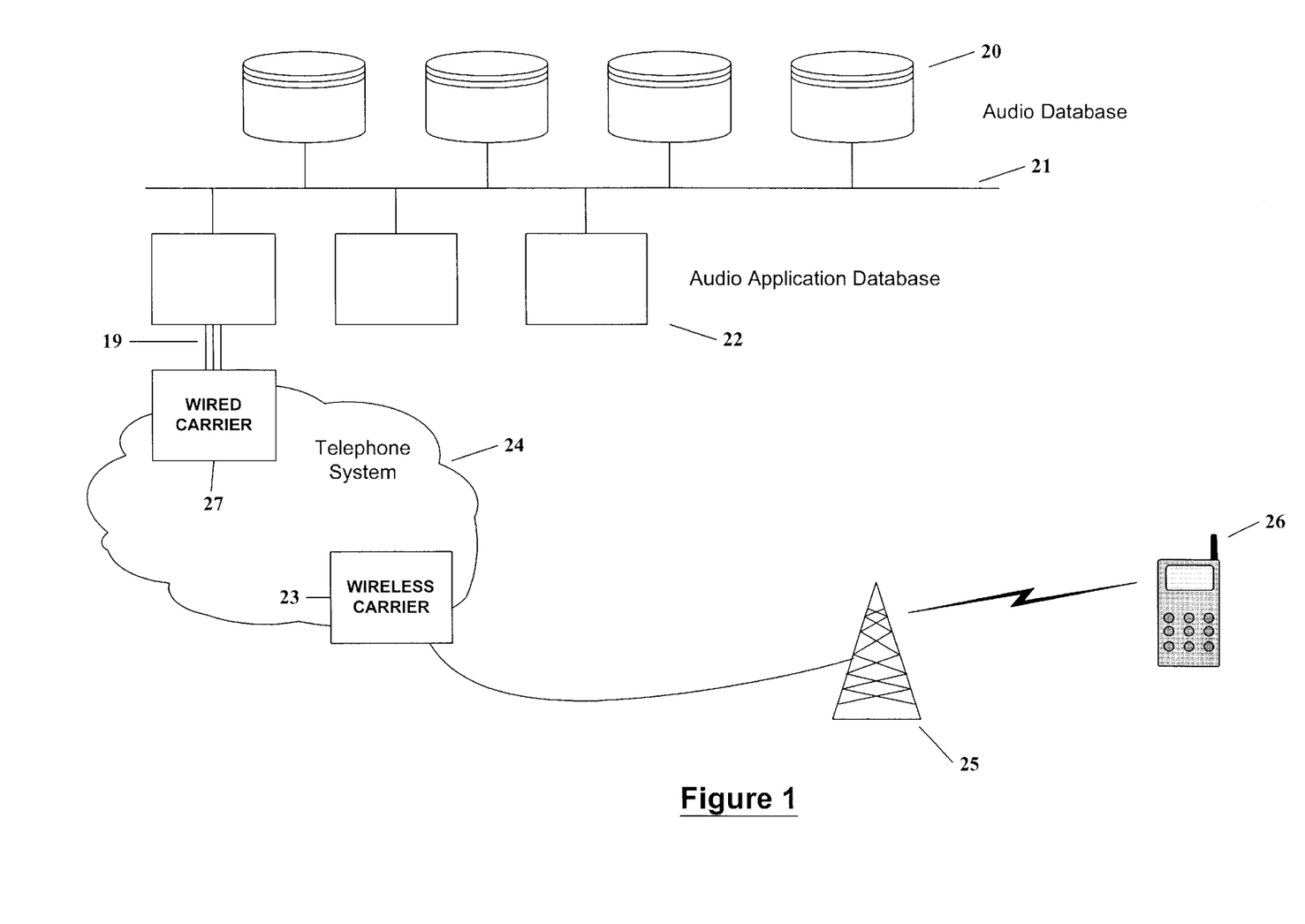
FIG. 1 illustrates a network arrangement for the delivery of audio programs.

FIG. 1 illustrates a network arrangement for the delivery of audio programs. The arrangement include an audio database 20, an audio application database 22, a telephony system 24, a telephony relay module 25, and a telephone replay device 26. The audio database 20 preferably includes a plurality of audio database servers that store audio content. The audio application database 22 includes audio application servers that store audio applications, which control the delivery of audio content in the audio program delivery system. In one embodiment, the databases 20, 22, are DB2 databases from IBM.

The telephony system 24 includes both wire carriers 27 and wireless carriers 23. As may be appreciated, in other embodiments, the telephony system includes various combinations of wire carriers and wireless carriers, as is required for the particular audio program delivery system.

The audio database 20 is coupled by a communication link 21 to the audio application database 22. The audio application database 22 and the audio database 20 are coupled to the telephony system 24 by a network link 19. In one embodiment, the network link 19 is a TI communication link.

The telephony system 24 is coupled to a telephony relay module 25, which receives telephone signals from the telephony system and relays the signals to user telephone devices. In a wireless carrier implementation, the telephony relay module 25 is a wireless cell tower, which receives wireless telephone signals from the wireless carriers and relays the signals to wireless telephone devices.

In operation, the user employs the telephone replay device to communicate with the audio program delivery system. In one embodiment, the user transmits DTMF signals to the telephony system 24. The DTMF signals are forwarded to the audio application database 22. The audio application database 22 responds to the user input by providing audio content in accordance with audio application data. The audio content is extracted from the audio database 20 and is delivered, in a navigable manner, to the user replay device 26. Accordingly, a user interacts with audio content and is provided an audio program. Some of the navigation features provided by the system of the invention include logical jumps, where the user navigates to logical portions of content, and layering, where the user is presented with multiple content layers.

Figure 8:
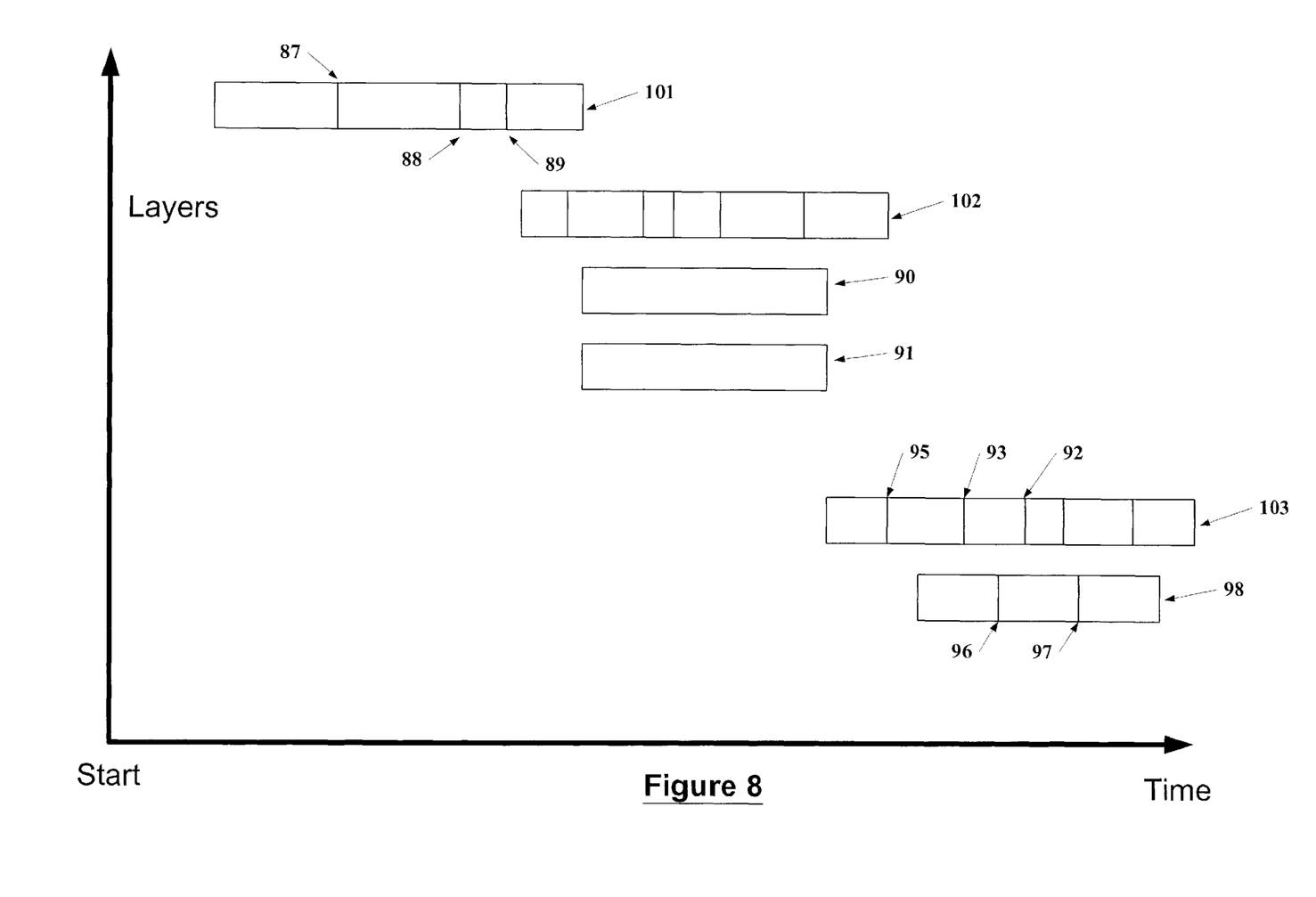
FIG. 8 is an illustration of the audio content segment navigation method of the invention.

As discussed above, the audio content that is delivered to the user replay device 26 is produced in accordance with audio application data. In one embodiment, audio content segments are arranged in both a linear and a parallel fashion so as to provide a plurality of content layers during the program replay. FIG. 8 illustrates an arrangement of segments delivered to a user device. Three segments 101, 102, 103 are arranged linearly, such that the start of a proceeding segment corresponds to the end of a previous segment. Accordingly, a linear arrangement of audio segments is provided. Preferably, the audio levels and tempo of the segments are matched to provide seamless flow between segments, when music is provided in the program.

Some of the linearly arranged segments 102, 103, are associated with parallel segment threads 90, 91, 98. For example, in the illustrated segments of FIG. 8, the second segment 102 is associated with two parallel segments 90, 91. The parallel segments 90, 91, are delivered to the user replay device at various levels of prominence. In one embodiment, during the replay of the second segment 102, a parallel segment 90 is brought into prominence for a predetermined period, while the second segment remains apparent to the listener. Hence, the parallel segment is made "visible." Such an effect is provided by, for example, reducing the volume level associated with the second segment 102 while increasing the volume level for the parallel segment 90.

In another embodiment, segments are made "visible" in accordance with control data. In one configuration, user control data is employed to determine which of several parallel segments is brought into prominence. Hence, several layered segments are available to the user during a portion of program replay.

In another embodiment, a parallel segment is automatically brought into prominence during a predetermined portion of the program. In one embodiment, this parallel segment is an advertizement message that is delivered to the user while the primary layer audio segment is delivered. Preferably, the advertisement does not interrupt the primary layer audio segment but is provided at a level, and during a portion of the content, so as to minimize such intrusive effects.

In another embodiment, the selection of which segments are available at various layers is predetermined according to the user preferences. For example, a user interacts with a user preference database to select three buttons that correspond to "artist," "producer," and "label." During the replay of a musical segment, the user selects "artist" to bring to prominence a first parallel segment that identifies the artist, "producer" to bring to prominence a second parallel segment that identifies the producer, or "label" to bring to prominence a third parallel segment that identifies the record label. As may be appreciated, other customized settings are selected by users, or the provider of the program, to deliver enhanced functionality within the audio program. In another embodiment, a button is associated with initiating the download of the replayed content to a private user location on the server system. The download is facilitated as a typical M-Commerce system where a user is associated with a local account, which corresponds to a mobile communication device.

The present invention further facilitates logical navigation within replayed audio. The logical navigation facilitates modifying audio replay in accordance with context-based portions of the audio rather than in accordance with blocks of time. FIG. 8 illustrates logical navigation tag data for audio segments. In one embodiment, the audio segment tag information associated with an audio segment 101 includes data relating to logical points within the segments 87, 88, 89, which the user may wish to proceed to during the segment's replay. For example, a music audio segment 101 includes data pointing to the chorus 87, the second verse 88, and an instrumental portion 89. Thus, when the user selects to proceed forward in navigating the audio segment 101, the replay proceeds to the next logical portion 87, 88, 89, rather than merely advancing the replay by some predetermined time block. In another embodiment, a second audio segment 103 relates to news stories. Tag data associated with the audio segment 95, 93, 92, corresponds to different topics in the news story. As may be appreciated, the navigational tag data relates to various context-sensitive aspects of the replayed audio segments, as is required for the particular audio delivery system or service. The navigational tags are determined by preforming a structured analysis of the audio content. The analysis detects portions of the data and stores corresponding pointers, or tags. Several file formats support such marking, including, Open Music Framework (OMF), and MPEG-7, by allocating provisions in the specifications for storing tags relating to the audio content.

In one embodiment, the logical navigation tag data is stored in a linked list data structure that is associated with a tag data for the audio segment. The tag data preferably indicates a time value, from the start of the audio segment, which corresponds to the logical jump location.

Figure 2:
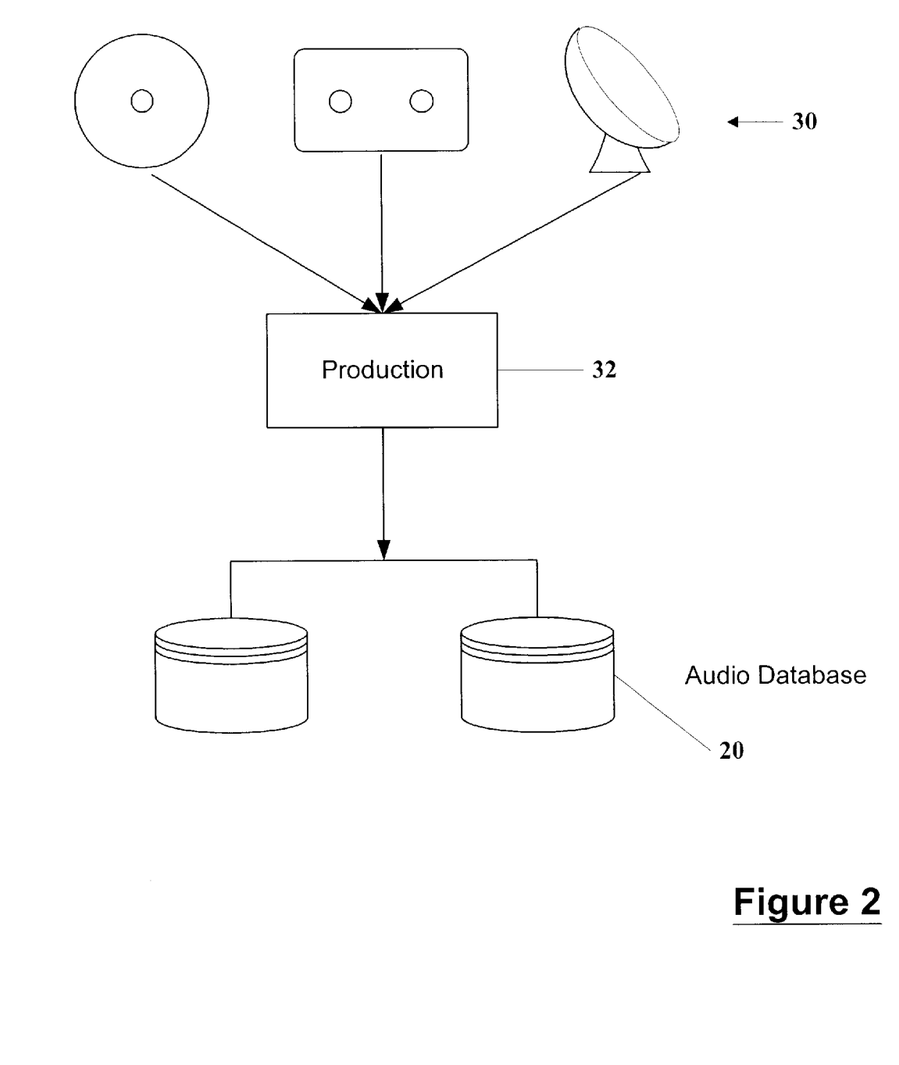
FIG. 2 illustrates a system arrangement for organizing audio content for replay in accordance with the invention.

FIG. 2 illustrates a system arrangement for organizing audio content that is to be replayed by the audio program delivery system of FIG. 1. The arrangement includes audio content 30 that is retrieved from various media such as CDs, tapes, satellite transmissions, radio transmissions, and televisions transmissions. The audio content 30 is further provided to the system in various formats. In one embodiment the formats include an MP3 format, a WAVE format, a MIDI format, and an analog format. The arrangement further includes a production module 32, which receives the audio content. Finally, the arrangement includes an audio database 20. The audio database 20, as discussed above with reference to FIG. 1, includes a plurality of audio database servers.

In operation, the audio content 30, from its various sources, is received by the production module 32. The production module 32 performs various conversion and editing operations on the received audio content 30 to generate a standard, and "tagged," format audio content. The audio content 30 is "tagged" by adding reference information to audio segments. In one embodiment, the reference information includes the segment's title, the segment's author, the type of content in the segment, the date that the segment was created, and the segment's expiration date. The audio segment, including the associated tag information, is provided to the audio database 20 for storage. In one embodiment, the audio segments are stored in accordance with an index that is derived from the corresponding tag information. Preferably, the production module is a personal computer running an audio processing application such as PRO TOOLS. However, other computer systems, which include a digital audio editor, a graphical interface, an audio input, and a file storing mechanism, are used.

Figure 3:
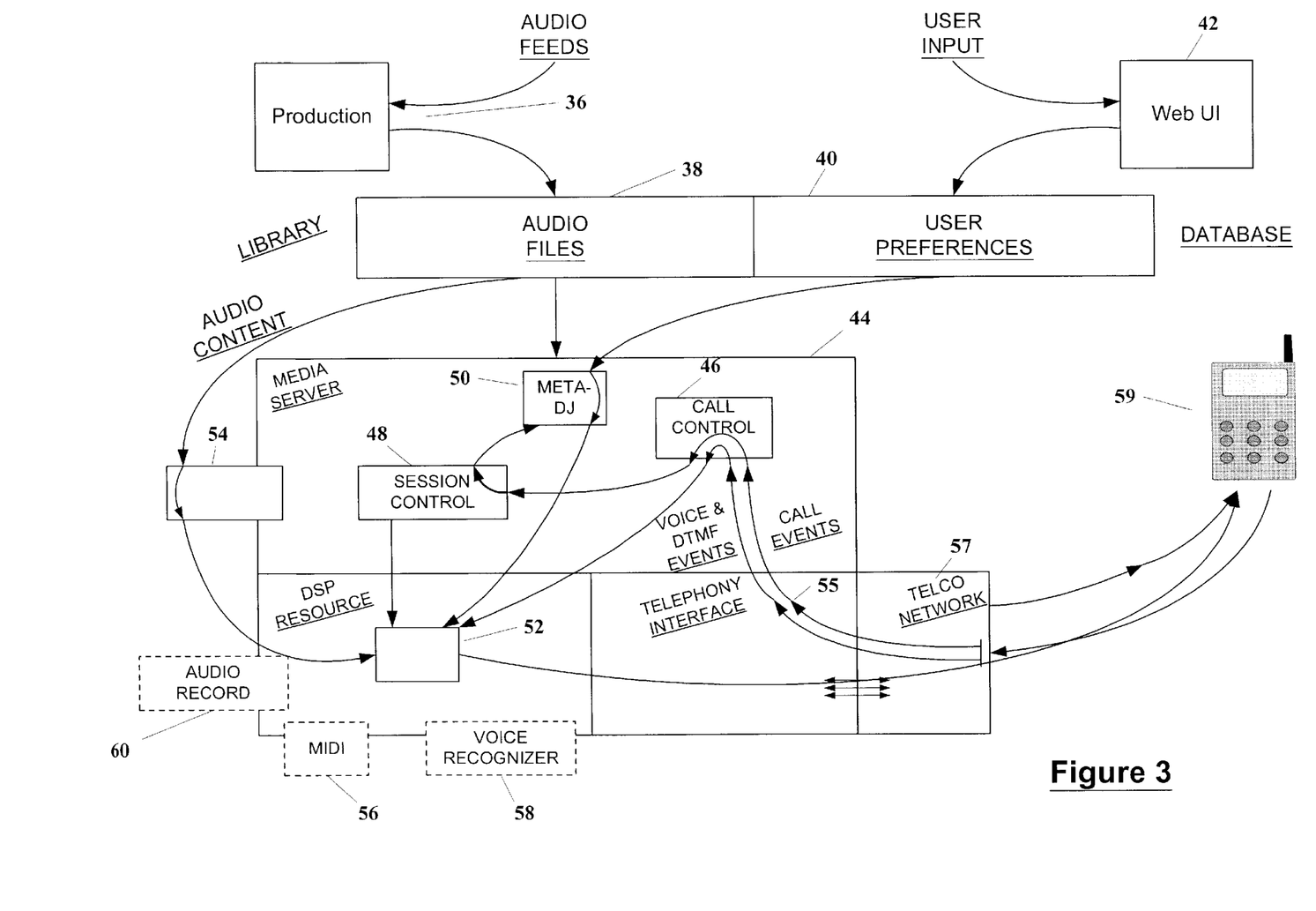
FIG. 3 illustrates a system arrangement for providing audio programs to a user telephony-based device.

FIG. 3 illustrates a system arrangement for providing audio programs to telephony devices. The system includes an audio processing module 36, which processes raw audio content and stores the audio content in an audio database, as discussed above with reference to FIG. 2. The system further includes an audio database 38 and a user preferences database 40. The audio database preferably includes an audio application database and an audio content database. The user preferences database 40 is used to store user information and user selections so as to allow the system to create customized audio programs for a particular user. In one embodiment, the user information includes selections of content that the user is interested in receiving and background information regarding the user, which allow the system to customize information provided to the user.

In one embodiment, the user preferences, which are stored in the user preferences database 40, are generated as a result of the user interacting with an Internet website. In this embodiment the Internet website includes a plurality of HTML pages, which facilitate the generation of a user preference profile by querying the user regarding certain attributes and selections relevant to the audio programs that the user desires to receive. As may be appreciated, such information is advantageously employed by an intelligent program generation module to create a customized program for the particular user, based on user selections and preferences.

The system includes a media server 44 that receives audio program data and employs that data to generate a program for an end user. The media server 44 includes a call control module 46, a session control module 48, an application replay module 50, and an audio replay module 52. Preferably, the media server 44 is comprised of a server cluster. The media server advantageously includes a digital signal processor (DSP) to process audio data.

The media server 44 is further associated with a telephony interface 55, which facilitates communication between the media server and a telephone company network. The system further includes an audio extraction module 54 that facilitates the retrieval of audio content from the audio database 38. In another embodiment, the audio extraction module 54 is not employed and the audio replay module 52 directly communicates with the audio database 38. In other embodiments, the system further includes a MIDI replay module 56, a voice recognition module 58, and an audio recording module 60.

In operation, the user establishes a connection with the telephone company network and directs the connection to the telephony interface 55 associated with the media server 44. The media server 44 initiates a session with the user by way of the telephony network 57 that is employed by the user. The telephony interface 55 forwards user selections to the call control module 46. One such selection is for logging-in. The login request is forwarded to the session control module 48 so as to authenticate the user. In one embodiment, such authentication is accomplished by prompting the user for a password. Preferably the password is a combination of DTMF signals, or a speech segment that is recognized by a voice recognition module 58. After authenticating the user, the session control module 48 transmits a "sign-on" command to the application replay module 50. The application replay module 50 extracts relevant data from the user preferences database 40 and from the audio database 38. For example, the user preferences database indicates that the user desires to receive a particular audio program as its start program. Accordingly, the replay module extracts the corresponding application from the audio database 38 and prompts the replay of the program.

After selecting the audio program for the user, the application replay module 50 communicates with the audio replay module 52 to deliver audio content to the user telephone device. In one embodiment, the application replay module 50 transmits a series of audio content identifiers, along with corresponding control information, to the audio replay module 52. Furthermore, the audio replay module 52 refers to data from user preferences database 40 to produce an audio program that is customized for the user.

The audio replay module 52 requests audio content from the audio extraction module 54. The audio extraction module 54 extracts audio content from the audio database 38 and provides such content, as requested, to the audio replay module 52. The audio extraction module is preferably part of the media server 44. The audio replay module 52 arranges and modifies the audio content in accordance with the audio application data as interpreted by the application replay module 50. The audio content is arranged as a produced program, and is then delivered to the user.

In one embodiment, the audio program includes audio links that are selectable by the user. In this embodiment, the audio links are special audio content segments that allow the user to respond and transmit a command to the system while the audio segment is playing so as to initiate the retrieval and replay of an audio program that is associated with the audio link. For example, an audio link may include the voice announcement of "baseball scores," which would allow a user to select the link to prompt a program that delivers baseball scores as part of its content.

In another embodiment the user transmits other control commands to the session control module 48 and, in turn, to the audio replay module 52 to control the replay on the content. In one embodiment, such additional commands are a pause command, a fast forward command, a rewind command, a stop command, a reset command, a logical jump command, a slow or tempo speed command, volume control commands, equalization commands, a parallel segment selection command, and a sign off command.

The delivery of segments as parallel layers is preferably facilitated by the audio replay module 52. The audio replay module 52 receives control signals from the application replay module 50 that include an identification of the segments that are to be delivered to the user replay device. In one embodiment, the control data further includes an effect identifier. The effect identifier includes segment layering, and segment mixing. As control signals are received from the user device, the application replay module 50 responds to the control signals by transmitting corresponding data to the audio replay module 52 to facilitate the user request. For example, a user request for a segment to be brought into prominence, results in a control signal from the application replay module 50 to the audio replay module 52 to provide segment layering in accordance with the user selections.

Figure 4:
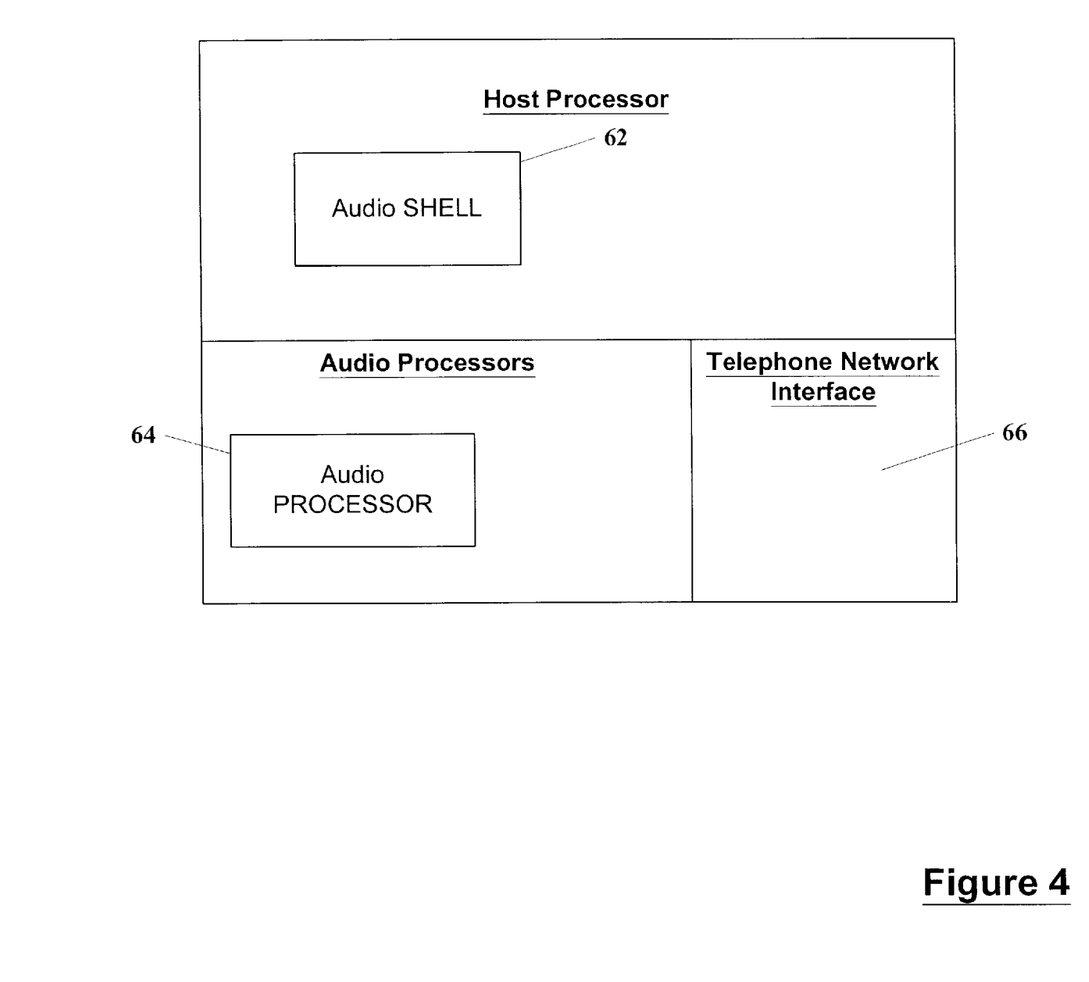
FIG. 4 illustrates the logical components of an audio program replay system.

FIG. 4 illustrates the logical components of an audio program replay system in accordance with the invention. The logical components include an audio shell 62, an audio processor 64, and a telephone network interface 66. The audio shell 62 facilitates flow control for the replay of an audio applications. The audio shell 62 facilitates commands and functionality such as a login command, database references and extraction, system set up and clean up, and other logical and functional services. The audio shell 62 communicates with the audio processor 64 to replay audio content, which is delivered to the user replay device. The functions provided by the audio processor 64 include audio playback, audio recording, audio filtering, special effects, mixing, and audio arrangement. The telephone network interface 66 is coupled to the audio processor 64 and to the audio shell 62 to facilitate communication with a telephone network.

In operation, the audio shell 62 extracts audio application data and implements logic and state flow for the audio program. The audio processor 64 facilitates the replay, arrangement, and production of audio content that is provided to the user by employing the telephone network interface 66.

Figure 5:
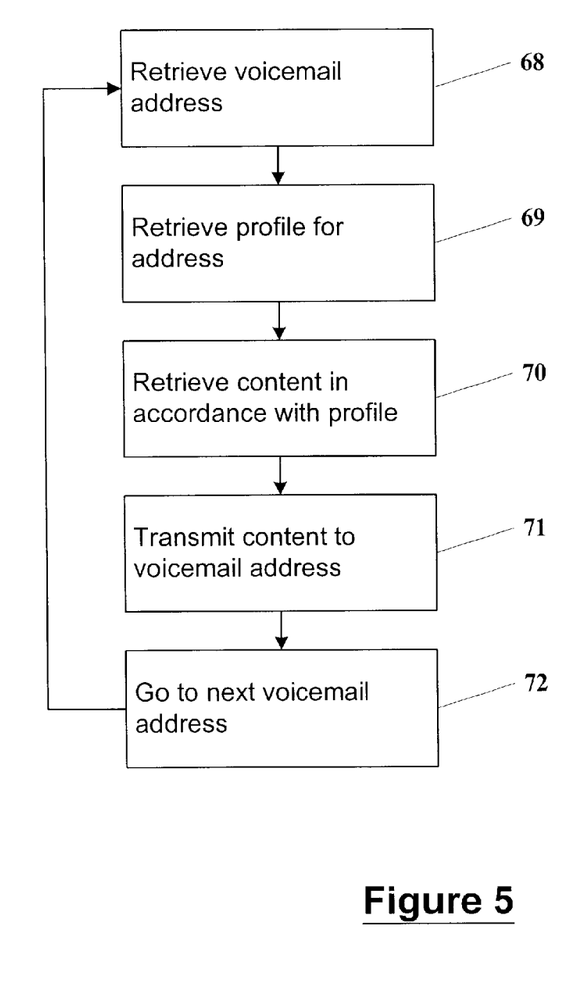
FIG. 5 is a flow diagram of a process for facilitating the marketing of musical content.

FIG. 5 is a flow diagram of a process for facilitating the marketing of musical content to consumers. The system of the present invention facilitates an audio content distribution method for marketing musical content. The music distribution method includes retrieving voice mail box addresses for target customers (Step 68). A particular profile associated with the voice mail box address is also retrieved (Step 69). Musical content is selected based on the profile that is associated with the voice mail box (Step 70). The musical content is then transmitted to the voice mail address (Step 71).

In one embodiment, the musical content is further associated with control data that allows the consumer to initiate a process for the purchase of products associated with the musical content delivered. In one embodiment, the musical content includes a telephone number and a coded password which corresponds to the user and the musical content delivered. The telephone number and password accordingly facilitate the purchase of the song.

The method then proceeds to the next voicemail address in the voicemail address list employed by the system, and selects musical content for the particular user (Step 72). In another embodiment, uniform musical content is sent to all voicemail boxes without employing a consumer profile. In another embodiment, a marketing profile is used to select voicemail boxes from the voicemail box database in accordance with a particular criteria for the reception of musical content which is marketed by the system. For example, some content is directed to consumers of an 18 to 24 age group. Accordingly, the voicemail address profiles are searched for consumers of that particular age group so as to transmit the content to targeted consumers.

Figure 6:
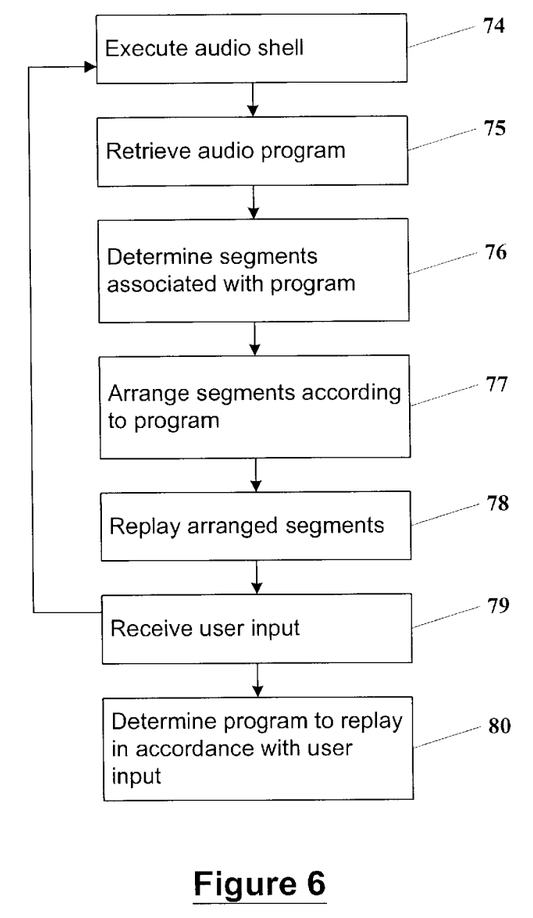
FIG. 6 is a flow diagram of a process for replaying an audio program.

FIG. 6 illustrates a process for replaying an audio program in accordance with the invention. The process includes executing an audio shell (Step 74). An audio application is then retrieved by the system (Step 75). The system determines the audio content segments that are associated with the application (Step 76). The system arranges and modifies the segments according to data associated with the audio application (Step 77). The system goes on to replay the program that results from the arrangement of the segments (Step 78). Additionally, the system receives user input and acts in accordance with such user input to modify the replaying of the audio program (Step 78, 80).

Figure 7:
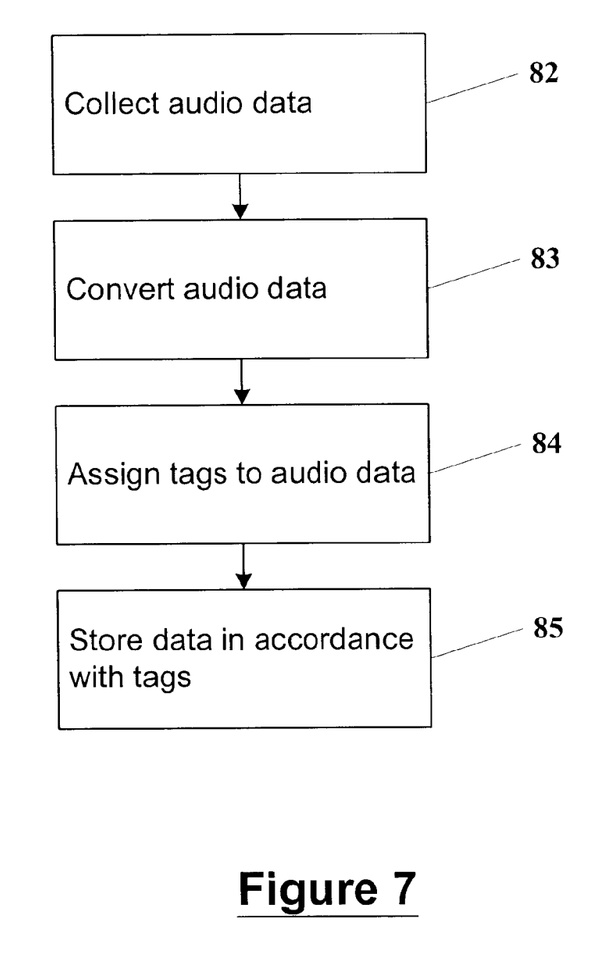
FIG. 7 is a flow diagram of a process for arranging audio content.

FIG. 7 is a flow diagram illustrating a process for arranging audio content for replay in a system of the present invention. The method includes collecting audio data from various sources (Step 82). The system converts the audio data to a uniform format (Step 83). In one embodiment, the system converts the audio data to a WAVE format. The system then assigns tag information to the audio content (Step 84). In one embodiment, each segment is assigned tag information which is later used to identify the audio segment. The system stores the data, in accordance with the tags that are assigned to the content, in the audio content database (Step 85).

The navigable audio delivery system of the present invention can be employed to facilitate music previews in a music store. Generally, consumers would like to preview the content of an audio product before buying the product. For example, when buying music compact discs, consumers would like to preview the music on the disc. Some merchants provide listening stations that allow the consumer to preview a limited number of musical selections. However, most selections are not available from the listening station. Accordingly, there is a need for a system that allows consumers to preview a wider range of musical content.

Therefore, in accordance with the invention, a musical content preview system is facilitated. The preview system includes a wireless communication device, and the navigable audio system. The wireless communication device includes a scanning module. The scanning module is adapted to scan a code on musical content packaging. The wireless communication device is coupled to the musical content server by a wireless communication link. In response to signals from the wireless communication device, the musical content server transmits audio content corresponding to the musical content in the scanned package.

The following is an exemplary scenario, illustrating a process for previewing musical content by employing a method and system in accordance with the invention. A consumer enters a music store and browses through the selections. The consumer finds a particular CD that could possibly be appealing to the consumer. But the consumer does not know for sure whether he or she will like the music. One option is to purchase the CD and listen to it later at home, hoping that the right decision was made. A second option is provided by a method and system in accordance with the present invention.

The consumer, when entering the music store, is handed an in-store cordless audio device. The device can receive and transmit signals within the store. The device is preferably further associated with a security interface that prevents removing the device from the store. A bar-code scanner is integrated into the device. In another embodiment, the device includes a numeric keypad which is used to enter a product code. The device also includes an audio replay module and a cordless telephone module. The audio replay module advantageously provides audio to an output device, such as headphones. The cordless audio device facilitates the communication of the device with an audio server of the store.

The consumer employs the device to preview musical content corresponding to a product of interest. The consumer scans the bar-code of the a CD so as to provide the product code of the CD to the device. The device transmits control signals to the in-store audio server to request the replay of the audio content corresponding to the product code. The in-store audio server preferably communicates with the device via Bluetooth.

In another embodiment, the device is a wireless telephone. The product code is entered by employing the telephone keypad. The wireless telephone preferably establishes communication with the in-store audio server by regular telephone communication.

An interactive audio program that facilitates the preview of the audio content is then delivered to the consumer by the server. The interactive audio program preferably allows the consumer to browse various portions of the content as determined by the particular store or music label.

Although the present invention was discussed in terms of certain preferred embodiments, the description is not limited to such embodiments. Rather, the invention includes other embodiments including those apparent to a person of ordinary skill in the art. Thus, the scope of the invention should not be limited by the preceding description but should be ascertained by reference to the claims that follow.

We claim:

1. A navigable audio system, comprising:
   an audio application database, the audio application database storing control data for controlling the replay of audio segments in an audio program;
   an audio content database, the audio content database storing audio segments content; and
   an application replay module, the application replay module extracting audio application data from the audio application database, the audio application data specially identifying audio segments and including a predetermined order and arrangement for replaying the specifically identified audio segments as a single audio program, the application replay module transmitting control signals to an audio replay module, the control signals generated in accordance with audio application data, the control signals facilitating the replaying of a plurality of audio segments stored in said audio content database;
   an audio replay module, the audio replay module receiving control signals from the application replay module, the audio replay module responding to control signals from the application replay module by facilitating the transmission of the plurality of audio segments, as a single user program, to a user replay device; and
   a telephone interface, the telephone interface facilitating the communication between the audio replay module and the user replay device, the telephony interface further facilitating the communication between the application replay module and the user replay module.

2. The system of claim 1, wherein the audio replay module facilitates the concurrent replay of at least two audio segments during a portion of the program replay.

3. The system of claim 1, wherein the application replay module responds to signals from the user replay device to increase the prominence of an audio segment when more than one audio segment is replayed by the audio replay module.

4. A platform for delivering audio programs, comprising:
   a database, the database storing audio application data, the database coupled to an application replay module;
   an application replay module, the application replay module extracting data related to an audio application for replay, the audio application data specifically identifying a plurality of audio segments and specifying a predetermined order and arrangement for replaying the specifically identified audio segments as a single audio program, the application replay module facilitating the playback of the plurality of audio segments associated with the replayed audio application;
   an audio replay module, the audio replay module coupled to the application replay module, audio replay module coupled to an audio database, the audio replay module delivering the plurality of audio segments, as a single user program, to a user audio output device;
   an audio database, the audio database storing audio segments, each audio segment associated with at least one identifying tag; and
   a telephony interface, the telephony interface coupled to the audio replay module and coupled to the application replay module, the telephony interface facilitating the reception of data from a user communication device and further facilitating the delivery of audio content to the user communication device.

5. A system for providing navigable audio, comprising:
   an audio processing module, the audio processing module receiving and processing audio content;
   an audio application storage module, the audio application storage module storing at least one audio application, the audio application specifically identifying a plurality audio segments and specifying a predetermined order and arrangement for replaying the specifically identified audio segments as a single audio program;
   a preferences module, the preference module storing user preferences;
   an audio content storage module, the audio content storage module storing audio content for replay,
   a media server for processing audio programs, the media server coupled to the audio application storage module and further coupled to an audio server, the media server facilitating the replaying of a plurality of audio segments as a single user program by reference to said scored audio application;
   an audio server for replaying audio segments for audio programs, the audio server receiving control data from the media server; and
   a telephone interface for communicating with a user replay and input device, the telephone interface coupled to the audio server, the telephone interface coupled to the media server.

\* \* \* \* \*